(12) United States Patent
Leone

(10) Patent No.: US 11,002,254 B2
(45) Date of Patent: May 11, 2021

(54) POWER PLANT UNIT FOR A HYBRID POWER PLANT

(71) Applicant: Barbara Leone-Meier, Fahrweid (CH)

(72) Inventor: Demetrio Leone, Fahrweid (CH)

(73) Assignee: Barbara Leone-Meier, Fahrweid (CH)

( * ) Notice: Subject to any disclaimer, the term of this patent is extended or adjusted under 35 U.S.C. 154(b) by 0 days.

(21) Appl. No.: 17/031,794

(22) Filed: Sep. 24, 2020

(65) Prior Publication Data
US 2021/0088033 A1 Mar. 25, 2021

(30) Foreign Application Priority Data
Sep. 25, 2019 (EP) .................................... 19199459

(51) Int. Cl.
| | |
|---|---|
| F03G 6/06 | (2006.01) |
| F01K 23/10 | (2006.01) |
| F02C 1/05 | (2006.01) |
| F02C 6/14 | (2006.01) |
| F01D 1/38 | (2006.01) |

(52) U.S. Cl.
CPC ............... *F03G 6/064* (2013.01); *F01D 1/38* (2013.01); *F01K 23/10* (2013.01); *F02C 1/05* (2013.01); *F02C 6/14* (2013.01)

(58) Field of Classification Search
CPC ...... F02C 6/14; F02C 1/04; F02C 1/05; F02C 7/042; F02C 9/18; F03G 6/064; F03G 6/04; F01K 23/10; F01D 1/38; F01D 1/20; F01D 1/26; F01D 1/023; F01D 1/02; F01D 1/04; F01D 1/18
See application file for complete search history.

(56) References Cited

U.S. PATENT DOCUMENTS

| | | | | |
|---|---|---|---|---|
| 5,584,181 A | * | 12/1996 | Jinnouchi | F02B 41/10 60/602 |
| 5,687,560 A | * | 11/1997 | Janes | F01D 1/00 60/39.58 |
| 5,857,337 A | * | 1/1999 | Kawasaki | F02B 37/183 60/602 |
| 6,107,693 A | * | 8/2000 | Mongia | F01K 21/047 290/4 R |
| 9,553,452 B2 | | 1/2017 | Gillett | |

(Continued)

FOREIGN PATENT DOCUMENTS

| | | |
|---|---|---|
| EP | 2711650 A1 | 3/2014 |
| GB | 2355768 A | 5/2001 |

(Continued)

OTHER PUBLICATIONS

European Search Report received in European Application No. EP19199459.9 dated Mar. 25, 2020, 2 pages.

*Primary Examiner* — Mark A Laurenzi
*Assistant Examiner* — Xiaoting Hu
(74) *Attorney, Agent, or Firm* — Hard IP LLC

(57) ABSTRACT

A turbine for a power plant unit for a hybrid power plant is arranged in a turbine housing in which a flow channel for a compressible medium is arranged. A drive shaft and at least one output impeller are arranged in the flow channel, the output impeller containing an output shaft for operating a generator, wherein the output impeller is connected in a rotationally fixed manner to the output shaft. The drive shaft is not connected to the output shaft.

17 Claims, 5 Drawing Sheets

(56) References Cited

U.S. PATENT DOCUMENTS

| | | | | |
|---|---|---|---|---|
| 2004/0244376 | A1* | 12/2004 | Litwin | F24S 20/20 |
| | | | | 60/641.8 |
| 2010/0221107 | A1* | 9/2010 | Anschel | F02M 35/10118 |
| | | | | 415/206 |
| 2011/0127773 | A1* | 6/2011 | Freund | F01K 23/10 |
| | | | | 290/52 |

FOREIGN PATENT DOCUMENTS

| | | |
|---|---|---|
| RU | 2059779 C1 | 5/1996 |
| WO | 2004063567 A2 | 7/2004 |

\* cited by examiner

POWER PLANT UNIT FOR A HYBRID POWER PLANT

RELATED APPLICATION

This application claims the benefit of European patent application no. EP 19199459.9, filed Sep. 25, 2019, the contents of which is hereby incorporated by reference in its entirety.

TECHNICAL FIELD

The present invention relates to a power plant unit for a hybrid power plant which can comprise a plurality of power plant units.

The present invention is therefore based on the object of further improving the efficiency of the decentralized power generation by using a hybrid power plant.

DESCRIPTION OF RELATED ART

A transportable power plant module is known, for example, from RU2059779 C1. The power plant module is arranged in a transportable container and contains several cells for a control device, a gas turbine and a generator. RU2059779 C1 describes the support of the gas turbine on frictionless bearings, which enable the gas turbine and generator to be aligned vertically and aligned coaxially with one another. However, no reference is made in this patent to the energy source used to operate the gas turbine. The power plant module of the RU2059779 C1 is presumably intended for transport in plants in which temporary available exhaust gas flows can be used selectively for energy generation.

There is therefore a need for a mobile power plant unit by means of which electricity can be generated without having to resort to an existing energy source. Such a mobile power plant unit should therefore be able to be used for decentralized power generation.

From WO2004063567 A1 it is known to equip a transport container with solar panels. Since the solar energy is converted directly into electricity via the photovoltaic panels, the solution has the disadvantage that it can only be used to generate electricity when daylight is available. The possibility of (intermediate) storage of electrical energy via batteries is mentioned to compensate for this disadvantage. A system that uses wind energy or water power in a decentralized manner to generate electricity and, if necessary, feeds it into a power grid is described in U.S. Pat. No. 9,553,452 B1.

An object of the invention is thus to provide a power plant unit which can be switched on in a flexible manner temporarily to convert thermal energy into electrical energy or is operated continuously in order to convert thermal energy into electrical energy.

In particular, thermal energy stored by means of the power plant unit can be processed at any point in time by supplying the stored thermal energy to a compressible medium via a heat exchanger, which is transformed into a heated compressible medium. The heated compressible medium is used to operate the turbine.

SUMMARY OF THE INVENTION

If the term "for example" is used in the following description, this term relates to exemplary embodiments and/or variants, which is not necessarily to be understood as a more preferred application of the teaching of the invention. The terms "preferably", "preferred" are to be understood in a similar manner by referring to an example from a set of embodiments and/or variants, which is not necessarily to be understood as a preferred application of the teaching of the invention. Accordingly, the terms "for example", "preferably" or "preferred" can relate to a plurality of embodiments and/or variants.

The following detailed description contains various exemplary embodiments for the turbine according to the invention and the power plant unit. The description of a particular turbine or power plant unit is to be regarded as exemplary only. In the description and claims, the terms "contain", "comprise", "have" are interpreted as "including, but not limited to".

A turbine according to the invention is arranged in a turbine housing in which a flow channel for a compressible medium is arranged. A drive shaft and at least one output impeller are arranged in the flow channel, the output impeller containing an output shaft for operating a generator. The output impeller is non-rotatably connected to the output shaft. The drive shaft is not connected to the output shaft. The drive shaft and the output shaft are therefore not coupled, that is, the rotational movement of the drive shaft takes place independently of the rotational movement of the output shaft.

This means that the drive shaft and the output shaft in particular have no mechanical connection to one another. The drive shaft and the output shaft are not coupled via a coupling mechanism. The drive shaft and the output shaft are thus mechanically decoupled.

The drive shaft can perform a rotational movement about the drive shaft axis. The output shaft can execute a rotational movement about the output shaft axis. The drive shaft axis and the output shaft axis can lie on a common straight line, that is, the drive shaft and the output shaft can be arranged coaxially to one another. The drive shaft axis and the output shaft axis can, however, also be arranged offset to one another, for example parallel to one another. The drive shaft axis and the output shaft axis can also include an angle with respect to each other that is not equal to 180 degrees.

The compressible medium can contain air or consist of air.

According to an embodiment, a circulation device for the compressible medium is provided, wherein the circulation device can be in fluid-conducting connection with the flow channel.

In particular, the circulation device can contain a feed for a heated compressible medium. The circulation device can contain a fluid passage comprising an at least partially variable cross-section through which the fluid can flow. According to an embodiment, the cross section through which the fluid flows downstream of the feed in the direction of flow of the compressible medium can first increase and then decrease continuously.

According to an embodiment, the circulation device contains a branch. By means of the branch, several feeds for the compressible medium can be implemented at different points of the turbine housing. The compressible medium can thus be supplied at various points in the flow channel, that is to say a plurality of feeds are provided.

The flow channel is provided with a drive side and an output side. The drive side contains the drive shaft. The output side is in the area of the output impeller or adjoins the output impeller downstream. The output side may contain part of the output shaft when the output impeller is located within the flow channel.

By means of the branch, the compressible medium can be divided into at least two partial flows. A partial flow of the compressible medium can be introduced into the flow channel on the drive side. A further partial flow of the compressible medium can be introduced into the flow channel on the output side.

According to an embodiment, the compressible medium flows in the flow channel from the drive side to the output side. The flow channel can have a flow cross-section which increases from the drive side in the direction of the output side, so that the compressible medium can expand in the flow channel. A feed for the compressible medium can be arranged on the drive side. Of course, several feeds can be provided on the circumference of the flow channel on the drive side. A feed for the compressible medium can be arranged on the output side. Of course, several feeds can be provided on the circumference of the flow channel on the output side.

The output shaft can be set into a rotational movement by means of the output impeller when the compressible medium flows through the output impeller. The compressible medium flows through the output impeller. The output impeller is provided with vane elements, for example guide vanes, which are set in a rotational movement about the output axis of the output shaft by the flowing compressible medium when the compressible medium flows through the output impeller.

The heated compressible medium can be obtained from the compressible medium by supplying heat. The heat can be supplied, for example, by means of a heat transfer medium in a heat exchanger.

According to an embodiment, the drive shaft can be set into a rotational movement by means of a starting device which drives the drive shaft at least in a running-in phase.

According to an embodiment, the drive shaft comprises an essentially conical section. In particular, the conical section can be provided with a profile. For example, the profile can be shaped helically or spirally in order to impart a swirl to the compressible medium flowing through the flow channel.

According to an embodiment, the flow channel contains a first, second or third flow channel section, the cross-sectional area of which changes in the direction of the longitudinal axis of the flow channel. In particular, the cross-sectional area of the second flow channel section can be constant. The cross-sectional area of the first flow channel section can at least partially increase. The cross-sectional area of the second flow channel section can be larger than the cross-sectional area of the first flow channel section.

In particular, the compressible medium or the heated compressible medium can be deflected from an axial flow to a tangential flow in the flow channel.

According to one embodiment, the turbine housing can contain a heating element for producing the heated compressible medium. In addition, a channel for heated compressible medium produced in the heat exchanger can be provided, which leads to the feed that opens into the flow channel.

A power plant unit in particular for a hybrid power plant can include a heat accumulator in addition to a turbine according to one of the preceding embodiments. The heat accumulator contains a heated heat transfer fluid, which can be fed to the heat accumulator from a heat source. The heat source can be provided for heating the heat transfer fluid, so that the heat transfer fluid can be converted into a heated heat transfer fluid. The heated heat transfer fluid can be stored in the heat accumulator. The heated heat transfer fluid can be fed from the heat accumulator to a heat exchanger by means of suitable fluid passages. The heat exchanger is configured to heat a compressible medium by means of the heated heat transfer fluid, wherein a heated compressible medium can be generated. The heated compressible medium can be fed to the turbine. The turbine can be driven by the heated compressible medium. The heat transfer fluid can comprise water or an oil-containing liquid or a molten salt.

The hybrid power plant can contain a plurality of power plant units, in particular, the hybrid power plant can contain at least 2 power plant units.

According to an embodiment, the turbine can be designed as a gas turbine in order to set the drive shaft in a rotational movement.

The turbine is arranged in a turbine housing in which a flow channel for the compressible medium is arranged. The flow channel can include a first, second, or third flow channel section. The cross-sectional area of each of the flow channel sections can change in the direction of the longitudinal axis of the flow channel.

According to an embodiment, an impeller is arranged in the flow channel, wherein the impeller is non-rotatably connected to the drive shaft. The heated compressible medium can be deflected from an axial flow to a tangential flow by means of a guide element arranged in the flow channel. The impeller can contain a plurality of impeller elements. Alternatively, a screw geometry can also be used; the impeller element or impeller elements are, according to this embodiment, arranged helically around the drive shaft.

According to an embodiment, the flow channel can be heated. Thereby, the suction effect increases, so that the flow velocity of the heated compressible medium flowing through the flow channel can be increased. When using a heated compressible medium, the speed of the output shaft can be increased and consequently the electrical power that can be generated by the generator can be increased. In particular, the turbine housing can contain a heating element or a channel for a heat transfer fluid.

The heat source can comprise an element from the group consisting of a solar cell, a photovoltaic panel, an internal combustion engine, a fuel cell, a burner element for a fossil fuel. The heat source can be designed as a solar cell or can be coupled to a solar cell in order to heat the compressible medium.

If the heat source comprises a solar cell, the solar cell can be designed as a flat plate collector. The flat collector can in particular comprise a double-walled hollow-chamber plate. The double-walled hollow-chamber plate can contain a transparent material, for example acrylic glass or polycarbonate. According to an embodiment, the double-walled hollow-chamber plate can contain an absorber body. The absorber body can be formed by a plurality of dents in the double-walled hollow-chamber plate.

According to each of the embodiments, the turbine or the power plant unit can comprise a monitoring unit. By means of the monitoring unit, operating parameters that are recorded by means of sensors can be determined and monitored. The monitoring unit can comprise a control unit, by means of which temperatures and pressures of the compressible medium, velocities of the drive shaft or the output shaft, operating times of the hybrid power plant unit can be controlled in relation to preset or specified target values.

A method for operating a turbine for a power plant unit for a hybrid power plant comprises the generation a rotational movement of the drive shaft. The turbine is arranged in a turbine housing in which a flow channel for a compressible medium is arranged. The drive shaft and at least one output impeller are arranged in the flow channel, the output impeller containing an output shaft. The output shaft is driven in the operating state by means of the compressible medium flowing through the turbine, a generator for generating electrical energy being driven by means of the output shaft when the turbine is in the operating state. The output shaft is set in rotational movement when the output impeller, which is connected to the output shaft in a rotationally fixed manner, is exposed to the compressible medium. The drive shaft and the output shaft are mechanically decoupled.

A method for operating a power plant unit comprises the operation of a turbine according to one of the preceding embodiments. A heated compressible medium is fed to the turbine. For this purpose, a heated heat transfer fluid from a heat accumulator is fed to a heat exchanger to heat the compressible medium, so that the compressible medium is heated by means of the heated heat transfer fluid, so that the heated compressible medium is generated, which is fed to the turbine. According to this embodiment, the turbine is operated by the heated compressible medium.

The heat accumulator thus contains a heated heat transfer fluid which is supplied to the heat accumulator from a heat source and is stored in the heat accumulator. The heat transfer fluid can be heated by means of the heat source, the heat transfer fluid being converted into a heated heat transfer fluid.

In particular, the drive shaft can be set into a rotational movement by means of a starting device in order to generate a fluid flow of the compressible medium or of the heated compressible medium.

Such a power plant unit can deliver a production output of at least 50 kW at a voltage of 400 V and a frequency of 50 Hz.

The turbine does not generate any harmful emissions, in particular no $CO_2$, no nitrogen oxides (NOx) and no fine dust, as the compressible medium is not subject to any material transformation.

According to an embodiment, the drive shaft is driven by means of a starting device, in particular an electric starter, which in turn can be fed by a 24V battery. However, the starting device is only required for the start-up phase, i.e. for a short period of time of a maximum of 10 minutes, in order to set the drive shaft in a rotational movement and to generate an input current of the compressible medium.

The compressible medium can be heated. The heating of the compressible medium allows for its expansion to a larger volume, which is a multiple of the volume of the input flow. If an expansion is not possible, the pressure of the compressible medium in the turbine housing increases accordingly, so that a compressed compressible medium is obtained. The compressed compressible medium is directed to one or a plurality of output impellers coupled to the output shaft. The output impellers are set in a rotational movement by means of the compressible medium, so that the output shaft can execute a corresponding rotational movement. A generator for generating electricity is located on the output shaft. When the output shaft is set in a rotational movement, electricity can thus be generated by the power plant unit according to the invention by means of the generator.

A hybrid power plant according to one of the exemplary embodiments described above is preferably used in locations which cannot be connected to a central power grid.

The power plant unit does not generate any emissions, in particular no $CO_2$. The power plant unit can contain up to 26,830 parts including small items and connecting elements, but the parts do not contain any components that contain elements from the group of rare earths, so that no special precautions are to be taken for the disposal of a power plant unit that is taken out of service.

A power plant unit can be accommodated in a commercially available transport container, for example it can be contained in a container of a length of approximately 6 meters (20 feet). Such a container can be designed, for example, as a 20 feet shipping container, which has the following dimensions: 5.66 m×2.07 m×2.2 m. This results in a required base area of 11.7 $m^2$ and a height of 2.2 m. According to an embodiment, the weight of such a power plant unit is 12.3 tons. The shipping container is used as a transport container for a power plant unit in sea and inland shipping and in combined road and rail transport. As soon as the container is set up, the power plant unit can be put into operation, electricity production can begin and the power plant unit can be connected directly to the local power grid or, as required, used as an independent power supply in remote locations.

The container contains the power plant unit, containing a heat accumulator and a turbine, which can be operated with associated auxiliary equipment, and a control unit, which can also include a monitoring unit. The control unit permanently monitors the operation of the power plant unit, detects errors at an early stage and, as far as possible, repairs them independently. If a monitoring unit is used, maintenance work can be carried out preventively, so that no interruption of its operation is required.

The turbine can convert the thermal energy contained in the heat storage device into a rotational movement of an output shaft coupled to the turbine, thus converting the thermal energy into a rotational movement. The output shaft is coupled to a generator that is used to generate electricity. In particular, a gear assembly, for example a two-stage gear, can be provided between the output shaft and the generator, which drives the generator or alternator in order to produce electricity. The electricity produced can be fed into the grid in accordance with legal standards.

Thermoelectric power plants of any production capacity can be put together from a plurality of power plant units with the same or different production capacity. For example, if one power plant unit delivers 200 kW of power, then Z power plant units can essentially deliver Z times 200 kW. In particular, Z can be an integer from 1 to 100. The power can thus be scaled essentially without losses, apart from the usual line losses.

Electricity is generated by the power plant unit by converting stored thermal energy. The thermal energy can be generated using solar energy, wind energy, water power, hydrogen, fossil fuels, the thermal energy can be fed into a heat accumulator and, if required, can be converted into electrical energy by starting up the turbine. The power plant unit only requires the supply of a very small amount of water per day. The heat accumulator can comprise an electrolysis unit.

A power plant unit for the generation of a daily output of at least 200 kW can find space in a container about 6 meters (20 feet) in length. The container, which contains the power plant unit, can thus be delivered via waterways, roads or rails to each respective place of use, since the dimensions of the same correspond to the international standard. Electricity can be produced 24 hours a day, especially if heat sources are provided, by means of which heat energy can be obtained from renewable energy sources, as well as corresponding heat accumulators, which provide thermal energy to the turbine when the energy source is temporarily unavailable.

The service life of a power plant unit can be at least 30 years. This means that electricity can be continuously generated, stored, consumed or fed into the local grid, 365 days a year for 24 hours for a period of at least 30 years efficiently in the smallest possible space.

The power plant unit can be set up anywhere in the world that can be reached by truck, ship, train or helicopter. The power plant unit can be extracted from the container at the point of use and can immediately produce electricity. If the power plant unit is operated with solar cells, the space required for the machine housing and the solar cells is only 80 m$^2$, including any intermediate spaces. Such intermediate space can exist for example, when making use of umbrella-shaped solar cells.

In addition to the use of traditional renewable energy sources such as hydropower, the share of renewable energies obtained from sun, wood, biomass, wind, geothermal energy and ambient heat increases for the energy supply. But it is also evident that e.g. photovoltaics will only fully exploit its potential in the next few decades. The efficiency of the conversion from solar energy to electricity is currently still too low.

In addition, traditional solar power plants cannot independently feed electricity into the grid from solar energy continuously for 24 hours a day. As a result, these solar power plants cannot compete with conventional electric power plants in terms of price and efficiency. The present power plant unit fulfills these needs because it can produce electricity 24 hours a day. The energy output is therefore expressed in kWh, since 200 kW can be produced per hour. Conventional photovoltaic systems (PV systems) indicate their output in kWp, since they can only produce electricity during the hours of sunshine during the day, i.e. especially during the maximum solar irradiation (peak). If this restriction is taken into account, a power plant unit according to any one of the embodiments of the present invention is many times more powerful than a conventional PV system.

BRIEF DESCRIPTION OF THE DRAWINGS

The power plant unit according to the invention is illustrated below in some embodiments. It is shown in.

DETAILED DESCRIPTION

Figure 1:
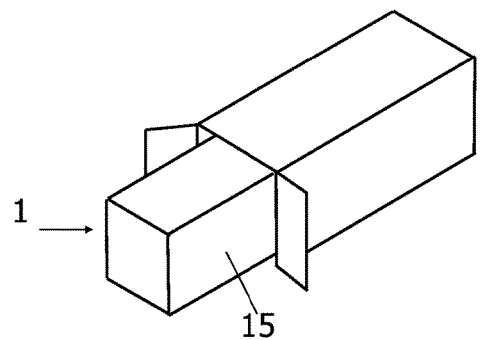
FIG. 1 a view of a power plant unit for a transport container.

FIG. 1 shows a power plant unit 1 for a hybrid power plant, which is partially accommodated in a commercially available transport container. The power plant unit 1 is located in the transport container and can thus be transported in the transport container by road, water, air or by means of rail vehicles. The power plant unit 1 comprises a plurality of system components, which are accommodated in a machine housing 15, which is closed for transport after the system components have been installed. The system components thus remain secured and protected against any unauthorized access during transport in the machine housing 15. After the power plant unit 1 has been put into operation at the place of use, the power plant unit 1 is locked by the producer in such a way that the user or operator of the power plant unit 1 is denied any access to the interior of the machine housing 15. The user or operator of the power plant unit should not worry about the maintenance or servicing of the power plant unit 1, since the producer of the power plant unit 1 is solely responsible for these tasks. The producer can check the operating status of each power plant unit 1 in use at any time, in particular, also via remote maintenance.

The machine housing 15 and/or each of the system components can be equipped with identification elements, which make it possible to check at any time whether all system components are present, whether these system components correspond to the system components installed in the manufacturer's plant, and whether the system components have been manipulated by unauthorized interference at any point in time. The machine housing 15 can be equipped with a GPS transmitter so that the exact location of each machine housing 15 can be checked by the producer at any time. In particular, the GPS sensor can be used to send feedback to the producer as soon as the machine housing 15 or any one of the system components is moved. In particular, at least the most important system components can be equipped with position sensors. The position sensors can determine the position of the relevant system component in the machine housing 15 or determine the position of two or more system components with respect to one another. By using the position sensors, the exact location of the system components in the machine housing 15 can be determined with an accuracy of less than 10 cm, preferably less than 10 mm, particularly preferably in a range of at most 5 mm. The position sensors can be coupled to monitoring elements which monitor the position of the system components in the machine housing 15. As soon as a system component therefore moves more than 10 cm, in particular more than 10 mm from its target position, an alarm can be triggered. The producer can immediately check whether it is an authorized change in the position of the system component, for example for maintenance or repair of the same, or whether an unauthorized intervention in the machine housing 15 has taken place and can immediately take suitable measures to prevent any damage to persons or the system.

Figure 2:
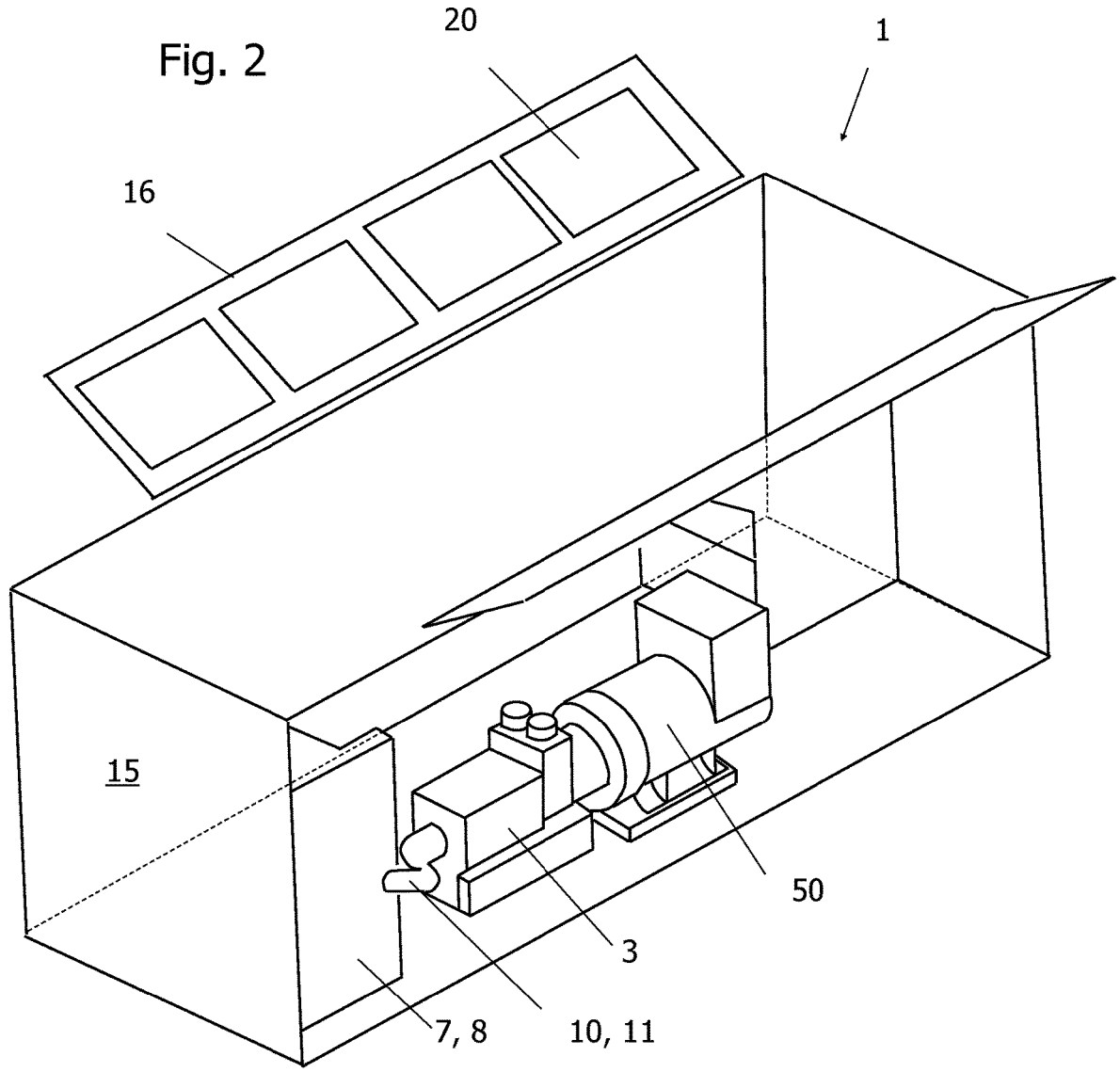
FIG. 2 a view of a power plant unit according to a first embodiment.

FIG. 2 shows a first embodiment for a power plant unit 1 for a hybrid power plant, the roof 16 of the machine housing 15 being partially open. According to this embodiment, the open roof 16 contains a plurality of photovoltaic panels 20 and preferably only remains open during installation in order to start the 200 kW cell using solar energy or to generate thermal energy for the heat accumulator. The roof 16 can then remain closed for stationary operation. In particular, the power plant unit 1 can be locked in such a way that it remains accessible only to the producer with access authorization, in particular through authentication, for example by entering a corresponding access code. Any manipulation by a user or operator and in particular any damage to the system components can thereby be prevented. A risk of injury can also be excluded for normal operation. The power plant unit 1 is put into operation for the first time at the destination by the producer's personnel responsible for commissioning. As soon as the power plant unit 1 can be operated without interference, the machine housing 15 can be sealed so that any unwanted access can be prevented.

In particular, the machine housing 15 or each of the system components can be equipped with RFID identification elements. These identification elements can already be built into each of the system components when the power plant unit 1 is manufactured.

Figure 3:
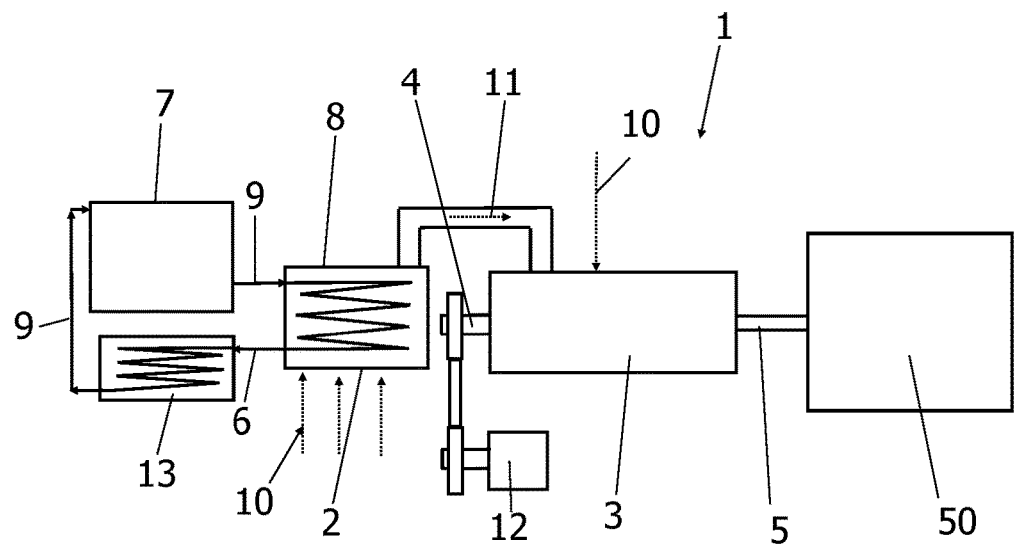
FIG. 3 a schematic representation of a power plant unit according to any one of the embodiments, FIG. 4*a* a section through a turbine for a power plant unit according to a first exemplary variant, FIG. 4*b* a section through a turbine for a power plant unit according to a second exemplary variant, FIG. 4*c* a section through a turbine for a power plant unit according to a third exemplary variant, FIG. 5 a view of a power plant unit according to a second embodiment, FIG. 6 an embodiment of a heat accumulator for a power plant unit according to one of the preceding embodiments, FIG. 7 an embodiment of a heat source for a power plant unit according to one of the preceding embodiments.

FIG. 3 shows a schematic representation of a power plant unit 1, in particular according any one of the embodiments shown in the following figures. The power plant unit 1 for a hybrid power plant contains a heat accumulator 7, a heat exchanger 8 and a turbine 3. A generator 50 can be driven to generate electrical energy by means of an output shaft 5, the output shaft 5 being set in a rotational movement by the turbine 3. The heat accumulator 7 contains a heated heat transfer fluid 9 which can be fed to the heat accumulator 7 from a heat source 13. The heat source 13 is provided to provide a heated heat transfer fluid 9 and to fill the heat accumulator 7. The heated heat transfer fluid 9 is used in the heat exchanger 8 in order to heat a compressible medium 10 flowing through the heat exchanger 8. The heat accumulator 7 is connected in a fluid-conducting manner to a heat exchanger 8 for heating a compressible medium 10 by means of the heated heat transfer fluid 9, so that a heated compressible medium 11 can be generated in the heat exchanger 8 from a compressible medium 10. The turbine 3 can be operated with the compressible medium 10 or the heated compressible medium 11.

A starting device 12 can be provided for starting up the turbine 3. The starting device 12 can be coupled to the drive shaft 4. For example, an electric starter can be provided.

Figure 4A:
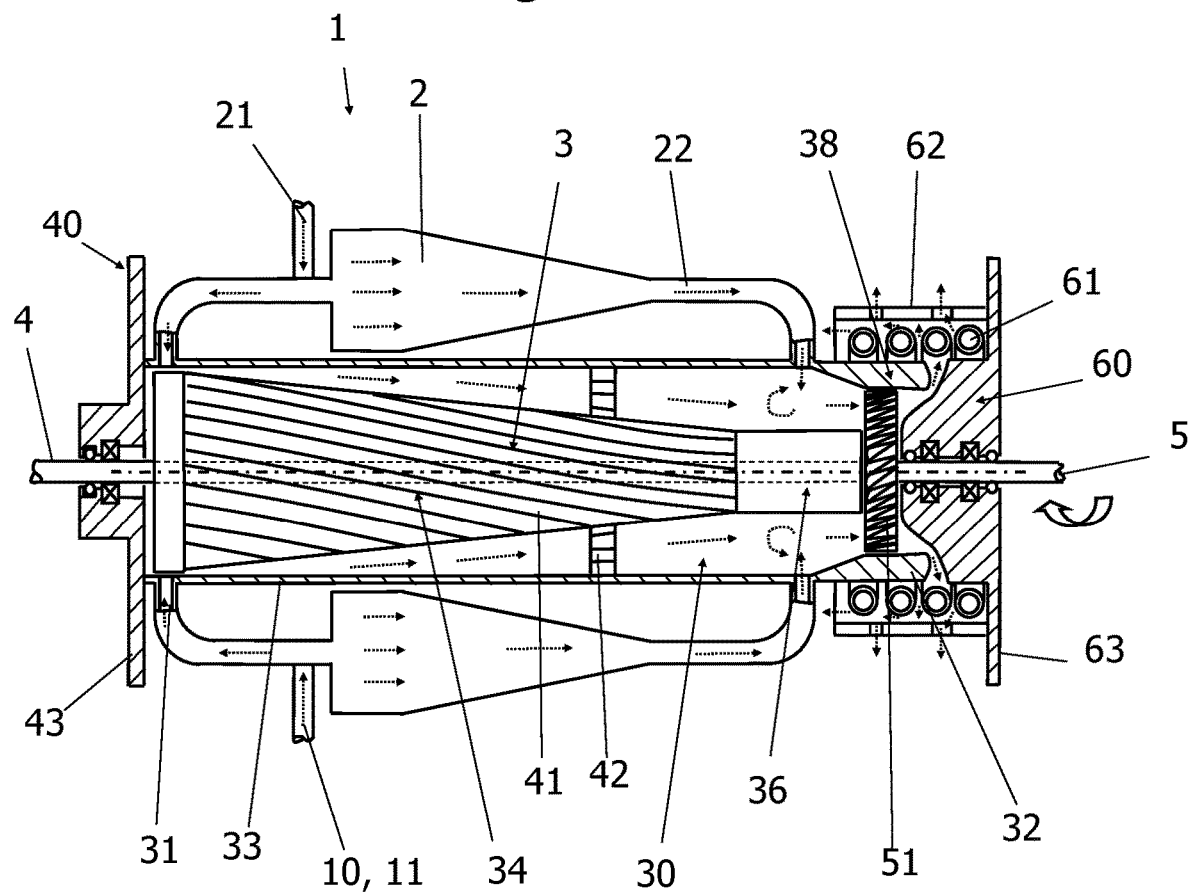

FIG. 4a shows a section through a turbine 3 for a power plant unit 1. According to the embodiment shown in FIG. 4a, the turbine 3 is designed as a gas turbine. In the operating state of the turbine 3, the compressible medium 10, 11 is fed to an output impeller 51. An output shaft 5 can be set in rotation by means of the output impeller. The output shaft 5 can drive a generator 50 for generating electrical energy (not shown).

The turbine 3 is arranged in a turbine housing 33. According to this embodiment, the turbine 3 has a flow channel 30 which is formed in the interior of the turbine housing 33. The flow channel 30 thus runs in the turbine housing 33. The cross-sectional area of the flow channel 30 increases continuously from the drive side 31 in the direction of the output side 32 until a maximum value of the cross-sectional area is reached, the cross-sectional area remaining constant until the compressible medium 10 reaches the output impeller 51.

According to the present embodiment, a first flow channel section 34, a second flow channel section 36 and a third flow channel section 38 can be distinguished, which extend between the drive side 31 and the output side 32. The third flow channel section 38 adjoins the second flow channel section 36. The second flow channel section 36 adjoins the first flow channel section 34.

A drive shaft 4 is located in the first flow channel section 34 and in the second flow channel section 36. In the first flow channel section 34, the drive shaft 4 has an essentially conical shape. The flow cross section of the flow channel 30 thus changes in the first flow channel section 34, wherein the flow cross section increases from the drive side 31 in the direction of the output side 32 in the first flow channel section 34. According to the present embodiment, the cone shape of the drive shaft 4 tapers in the direction of the second flow channel section 36. In the second flow channel section 36, the drive shaft 4 has an essentially cylindrical shape.

According to the present embodiment, a plurality of profiles 41 are arranged in the flow channel 30 in the first flow channel section 34, wherein the profiles 41 are arranged on the drive shaft 4. In particular, the section of the drive shaft 4 is configured as a cone with profiles 41. Downstream of the drive side 31, the cross-sectional area of the flow channel 30 increases continuously in the first flow channel section 34, wherein a second flow channel section 36 and a third flow channel section 38 adjoin the first flow channel section 34. The cross-sectional area of the flow channel 30 according to the present embodiment is essentially constant in the second flow channel section. The fluid flow is set into a rotary movement in the first flow channel section 34 and the second flow channel section 36 or a rotary movement of the fluid flow already induced by the profile 41 is amplified. In addition, one or more guide elements 42 can be arranged on the drive shaft 4, by means of which the fluid flow can be aligned in such a way that a swirl can be imparted to the compressible medium at least in a partial region of the first flow channel section 34 or in the second flow channel section 36. The feed into the output impeller 51 can take place essentially without losses, since the flow direction of the fluid corresponds to the optimal angle of attack for the vane elements of the output impeller 51 and therefore results in an optimal direction of flow to the vane elements of the output impeller 51.

By using a cone that tapers in the direction of the output side 32 in the first flow channel section 34 and the subsequent constant flow cross section of the flow channel 30 in the second flow channel section 36 as well as the deflection of the fluid flow for the flow to the output impeller 51 in the third flow channel section 38, the compressible medium 10, 11 can expand in the turbine 3 and can flow at an optimum angle of attack to the output impeller 51 due to the swirl in the second flow channel section 36. The expansion of the compressible medium 10, 11 creates an additional suction effect on the drive side 31, so that, according to this design, no additional fan is required for the operation of the turbine 3.

The suction effect can be further increased if the turbine 3 is heated or a heated compressible medium 11 is fed to the turbine 3. For example, a heating element can be attached in the turbine housing 33. As an alternative or in addition to the above, there channels for a heat transfer fluid can be provided in the turbine housing 33 (not shown). The heated heat transfer fluid 9, for example, can be used as the heat transfer fluid, which can be guided directly from the heat accumulator 7 (see FIG. 3) to the channels via a line not shown in FIG. 4a.

According to the present embodiment, the swirl of the compressible medium 10, 11 flowing through the flow channel 30 can be increased by the profile 41 in the first flow channel section 34 when the compressible medium 10, 11 is passed through the flow channel 30. The increased swirl can lead to an increase in the flow velocity of the compressible medium 10, 11, as a result of which the rotational speed of the output impeller 51 can be increased so that a higher revolution speed of the output shaft 5 can be obtained. The power delivered by the generator 50 (not shown here) consequently increases and, surprisingly, the effectiveness of the power plant unit 1 is further improved.

According to the present embodiment, the turbine 3 contains a circulation device 2 for the compressible medium 10, 11. The circulation device 2 is in fluid-conducting connection with the flow channel 30. In particular, the circulation device 2 can contain a feed 21 for a heated compressible medium 11. Alternatively, or additionally, a plurality of such feeds 21 can be provided. In FIG. 4a two such feeds 21 are shown. More than two feeds 21 could also be provided. The feeds 21 can open into a common delivery line. The delivery line can, for example, be designed in an annular manner. The annular delivery line can run around the flow channel 30, for example it can form a ring around the turbine housing 33. The delivery line is omitted in the present illustration. The heated, compressible medium passes from the heat exchanger 8 to the feed or the plurality of feeds 21 by means of the delivery line.

The circulation device 2 contains a fluid passage 22, wherein the cross section through which the fluid flows is at least partially variable. The fluid passage 22 extends from the drive side 31 to the output side 32. The fluid passage 22 has an opening into the flow channel 30, which is arranged in the vicinity of the drive side 31. The fluid passage 22 comprises a discharge opening into the flow channel 30, which is arranged in the vicinity of the output side 32. According to the present embodiment, the discharge opening is arranged between the second flow channel section 36 and the third flow channel section 38.

According to the present embodiment, the cross-section of the fluid passage 22 through which the fluid flows increases downstream of the feed 21 in the direction of flow of the compressible medium 10, 11, and then continuously decreases. In particular, the fluid passage 22 downstream of the feed 21 can contain a diffuser-like enlargement of the flow cross-section, wherein a nozzle-like restriction of the flow cross-section can adjoin the diffuser-like enlargement.

In particular, the circulation device 2 is provided with a branch. The compressible medium 10, 11 passing through the feeds 21 into the fluid passage 22 is either routed at the junction into a fluid passage section which leads to the discharge opening near the drive side 31 or into a fluid passage section which leads to the discharge opening near the output side 32. A first partial volume of the compressible medium 10, 11 in the fluid passage 22 thus flows in the vicinity of the drive side 31 into the flow channel 30, a second partial volume of the compressible medium 10, 11 flows in the vicinity of the output side 32 into the flow channel 30.

If a plurality of fluid passages 22 is provided, a plurality of first partial volumes of the compressible medium 10, 11 flow in each of the fluid passages 22 at the drive side 31 into the flow channel 30, and a plurality of second partial volumes of the compressible medium 10, 11 flow at the output side 32 into the flow channel 30.

If the flow cross-section of the flow channel 30 increases, as shown in the present embodiment for the first flow channel section 34, each of the first partial volumes is expanded. In addition, the compressible medium 10, 11 flows through the flow channel 30 in the direction of the output side 32, forming a swirl. Due to the rotation of the drive shaft 4 and the profiles 41 located on the drive shaft 4, the vector, which illustrates the flow velocity of the compressible medium 10, 11, contains an axial component and a radial component of the flow velocity so that a swirl is created. This swirl is reinforced by the compressible medium 10, 11 flowing in radially through the discharge opening in the vicinity of the output side 32.

In addition, one or more guide elements 42 can be arranged in the first flow channel section 34. The guide element 42 contains openings for the fluid flow, which can be located in the vicinity of the profile 41/and/or can be arranged in a central region of the flow channel cross section. The guide element 42 also serves to center the drive shaft 4 in the turbine housing 33 in which it is slidably supported.

As a result of the swirl, the angle of attack on the guide vanes of the output impeller 51 can be optimized, so that a flow against the guide vanes of the output impeller 51 can be achieved with as little loss as possible.

The output impeller 51 is located on the output shaft 5. The output shaft 5 extends from the output impeller 51 through the turbine housing 33 and protrudes beyond the output shaft housing 60. The output shaft housing 60 contains at least one roller bearing; two bearings are shown in the present embodiment. Sealing elements can be provided in order to prevent lubricant from getting from the bearings into the compressible medium 10, 11.

According to the present embodiment, the turbine housing 33 is clamped between the drive shaft housing 40 and the output shaft housing 60. The drive shaft housing 40 is provided with a flange 43 for this purpose. The output shaft housing 60 is provided with a flange 63. The flange 43 has bores for clamping screws, the flange 63 has corresponding bores for the clamping screws. The bores and clamping screws are omitted in the present illustration. The turbine housing 33 can be clamped between the drive shaft housing 40 and the output shaft housing 60 by means of the clamping screws.

The output shaft housing 60 can contain a cooling element 61, which is designed, for example, as a coil. The coil contains a coolant such as water. The cooling element 61 serves to cool the compressible medium 10, 11, in particular for the variant according to which a heated compressible medium 11 is used before the compressible medium 10, 11 reaches the environment. The cooling element 61 is arranged in a cooler housing 62, which is supported on the output shaft housing 60 or on the turbine housing 33. The cooling element 61 shown is to be understood as one exemplary embodiment of a possible configuration of such a cooling element. Instead of a coil, plate-shaped cooling elements, possibly with cooling fins, could also be provided if air cooling is sufficient, which is not shown in the drawings.

Figure 4B:
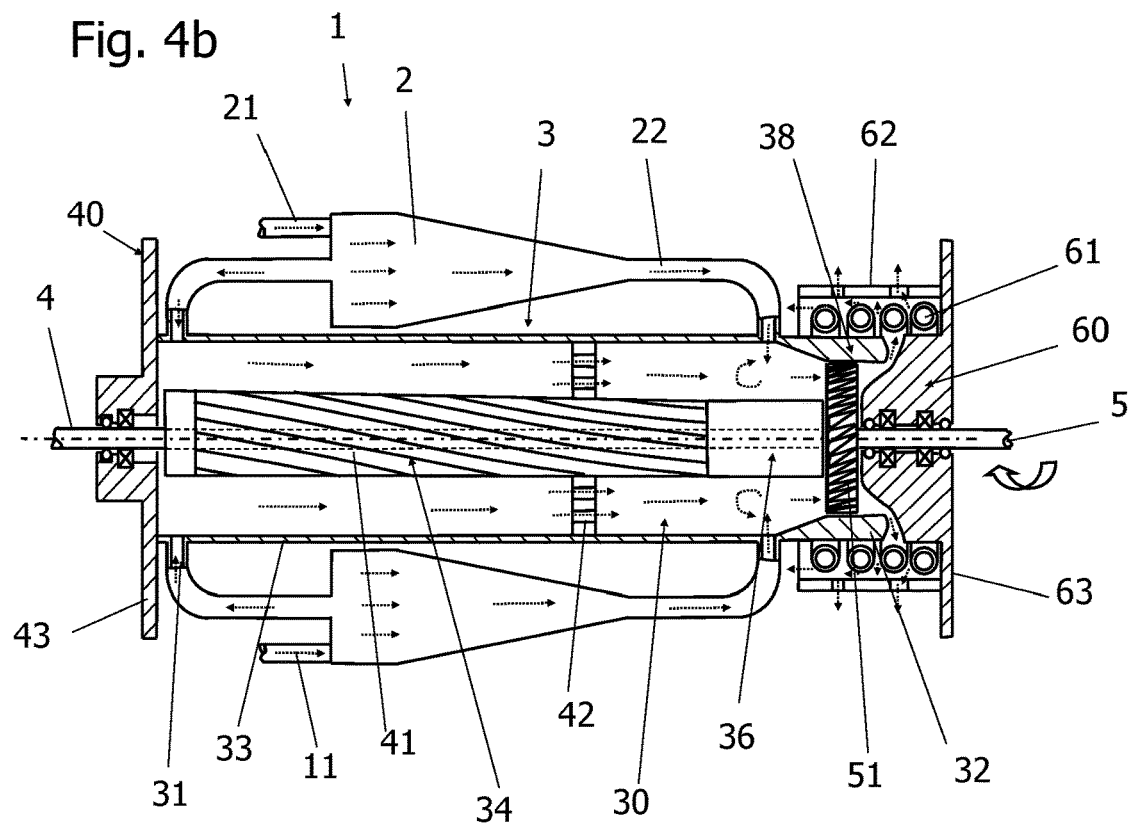

FIG. 4b shows a section through a turbine 3 for a power plant unit 1 according to a second exemplary variant. Identical elements as shown in FIG. 4a carry the same reference numerals in FIG. 4b. In the following, only the differences to the embodiment shown in FIG. 4a will be discussed.

According to FIG. 4b, the flow channel 30 has an essentially constant cross-sectional area in the first flow channel section 34 and in the second flow channel section 36. As in the previous exemplary embodiment, the drive shaft 4 has a profile 41 which has a helical or spiral-shaped configuration.

According to the present embodiment, the feed 21 is arranged in the region of the fluid passage 22 which has the largest flow cross section. As a result, the flow velocity of the compressible medium 10, 11 flowing in can be kept low. The fluid passage 22 is provided with a nozzle which is characterized by a continuous decrease in the flow cross section in the direction of flow. In the nozzle region, the flow velocity of the compressible medium 10, 11 can thus be increased, so that the compressible medium flows at an increased flow velocity through the discharge opening in the vicinity of the output side 32. As a result, the swirl can be increased even further immediately before it enters the output impeller 51. Flow losses in the flow channel 30 are avoided according to this variant, so that this variant is particularly suitable for high-speed turbines 3.

Figure 4C:
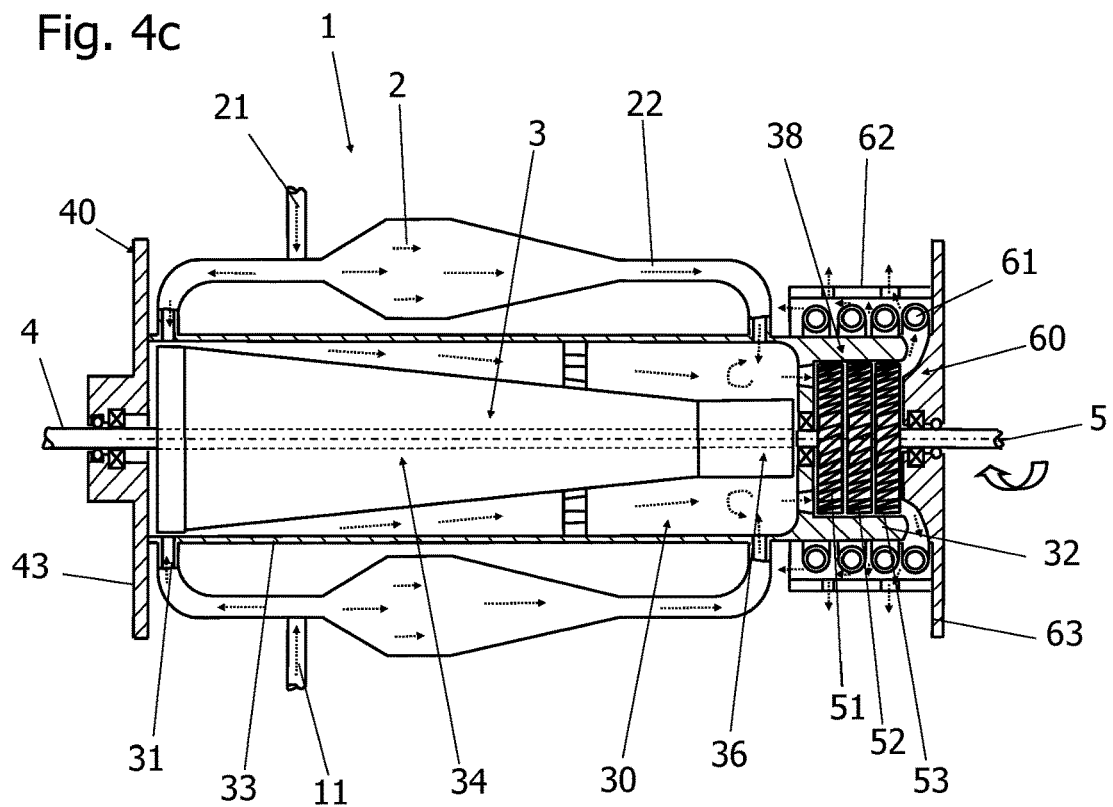

FIG. 4c shows a section through a turbine 3 for a power plant unit 1 according to a third exemplary variant. Identical elements as shown in FIG. 4a carry the same reference numerals in FIG. 4c. Only the differences to the embodiment shown in FIG. 4a will be discussed in the following.

According to the third variant shown in FIG. 4c, no profile of the drive shaft 4 is provided in the flow channel 30. As in FIG. 4a, the flow cross-section increases in the first flow channel section 34, so that the flow velocity is reduced due to the diffuser effect in the first flow channel section 34. The compressible medium can expand so that an increased suction effect is obtained in the discharge opening in the vicinity of the drive side 31. As a result, the proportion of the compressible medium which flows from the branch in the direction of discharge opening located on the drive-side is increased.

According to this embodiment, the fluid passage 22 has a continuously enlarged passage section, a passage section of constant flow cross section and a tapering passage section in which the flow cross section decreases. In the continuously enlarged passage section, the flow velocity is reduced, wherein wall detachments and thus velocity losses due to the shape of the fluid passage can be reduced. As a result of the tapering passage section, the flow velocity of the compressible medium 10, 11 can in turn be increased before the compressible medium 10, 11 reaches the flow channel 30 of the turbine 3 through the outlet opening on the output side. This third variant is particularly advantageous with slow-running turbines, since flow velocity losses that can arise from a profile or through a separation of the flow in the event of sudden cross-sectional enlargements, as shown in the fluid passages of the first two variants, can be minimized.

In the variant according to FIG. 4c, it is also shown that three output impellers 51, 52, 53 are provided in order to further reduce flow velocity losses. A plurality of output impellers can of course also be provided for the variants according to FIG. 4a or FIG. 4b.

Each of the features described can be used in each of the variants. The variants according to FIG. 4a or FIG. 4b or FIG. 4c can therefore be combined as desired.

Figure 5:
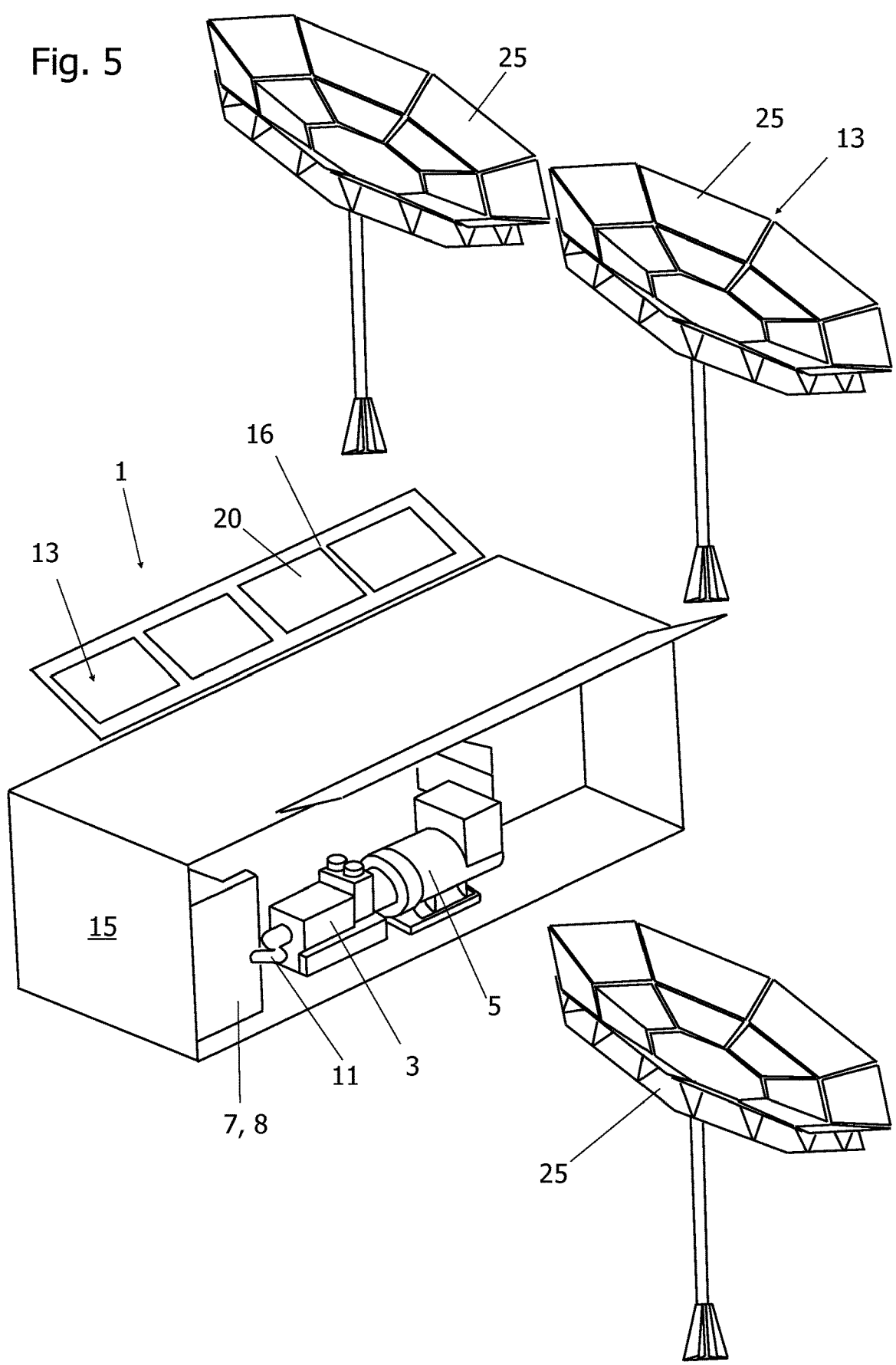

FIG. 5 shows a view of a power plant unit 1 according to the second embodiment, which, as in FIG. 2, is provided with a plurality of photovoltaic panels 20 on the inside of a hinged roof 16. The roof 16 serves to keep the machine housing 15 closed when the photovoltaic panels 20 cannot generate energy or when the interior of the machine housing 15 has to remain closed due to weather conditions.

The photovoltaic panels 20 can represent an embodiment of a device for generating heat, that is to say, a heat source 13, wherein the heat can be stored in the heat accumulator 7. The heat accumulator 7 can provide the heated compressible medium 11 for the operation of the turbine 3.

According to FIG. 5, a solar cell 25 can also be provided as a heat source 13. According to FIG. 5, a plurality of solar cells 25 can also be used. In particular, the solar cell 25 can be configured as a flat-plate collector for heating the heat transfer fluid. The flat-plate collector can comprise a double-walled hollow-chamber plate. In particular, the double-walled hollow-chamber plate can contain a transparent material, for example acrylic glass or polycarbonate. According to one embodiment, the flat-plate collector, in particular the double-walled hollow-chamber plate, can contain an absorber body. The absorber body can be formed by a plurality of dents in the double-walled hollow-chamber plate.

A starting device, for example an electric starter, can be provided to generate an initial rotational movement of the drive shaft 4, so that a flow of the compressible medium 10, 11 is generated and the rotational movement of the output shaft 5 can thus be initiated via the output impeller 51.

The starting device can switch itself off automatically after the fluid flow has stabilized, that is to say a continuous rotational movement of the drive shaft 4 takes place. In particular, the compressible medium 10, 11 in the turbine housing 33 can be heated by means of stored heat during the starting phase, that is to say while a swirl is building up in the fluid flow in the flow channel 30 (see FIGS. 4a-4c). The volume of the heated compressible medium 11 thus expands to a multiple of the volume of the compressible medium 10, as a result of which the output impeller or the output impellers 51 are driven and the output shaft 5 is set in rotation with the required torque.

According to an embodiment, electrical energy can be used to operate the starting device instead of thermal energy. In particular, the electrical energy can be provided by means of the photovoltaic panel 20. The electrical energy can also be temporarily stored via an energy storage device until it is used.

The electrical energy generated by means of the photovoltaic panel 20 can thus be used as a starting aid for the start-up phase of the turbine. For example, the drive shaft can be driven with an electric starter, which is fed by a 24V battery. Thus, within a short period of time, the drive shaft 4 of the turbine 3 (see FIGS. 4a-4c) is set in a rotational movement so that a suction effect for the compressible medium 10, 11 can be generated. When the compressible medium 10, 11 is heated, it can expand to several times of its original volume. The increase in volume increases the pressure of the compressible medium 10, 11 flowing through the turbine 3, so that the rotational movement of the output impeller or the output impellers 51 can be initiated or increased so that the output shaft 5 can drive a generator for generating electrical energy.

Figure 6:
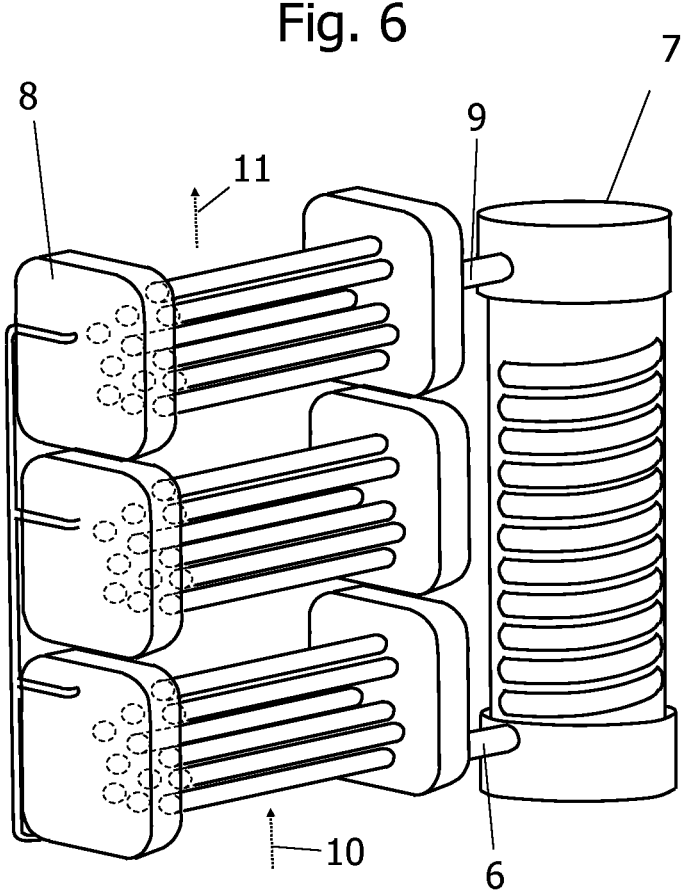

FIG. 6 shows an embodiment of a heat accumulator 7 and a heat exchanger 8 for a power plant unit 1 according to one of the preceding embodiments. The heat exchanger 8 for heating a compressible medium 10 is fed by the heated heat transfer fluid 9, which circulates in the tubes of the heat exchanger 8 designed as a tube bundle heat exchanger so that a heated compressible medium 11 can be generated. According to the present embodiment, the heated heat transfer fluid 9 flows within the tubes. The heat transfer fluid 9 is made available in the heat accumulator 7. The heat accumulator 7 can be fed by a heat source 13 (not shown) selected from the group consisting of a solar cell, a photovoltaic panel, an internal combustion engine, a fuel cell, a burner element for a fossil fuel, a wind turbine.

Figure 7:
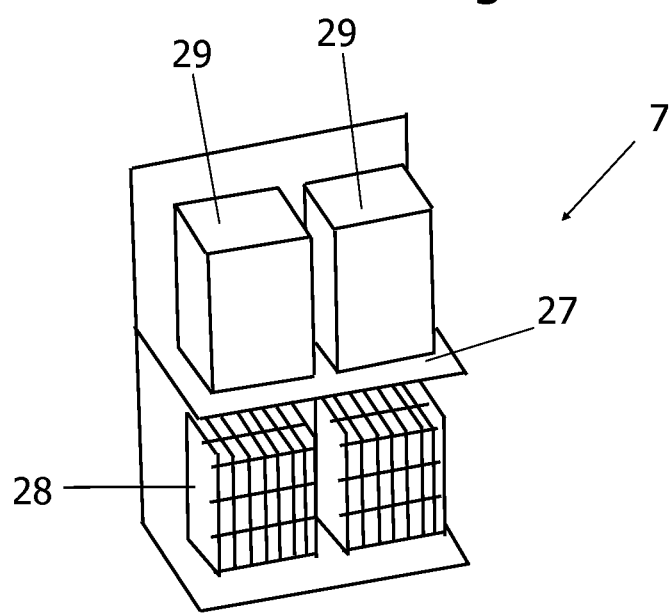

FIG. 7 shows an embodiment of a heat accumulator 7 for a power plant unit 1 according to one of the preceding embodiments. According to FIG. 7, this heat accumulator 7 is configured as a fuel cell 27. The fuel cell 27 contains a plurality of reaction units 28 and a storage container 29 each for oxygen and hydrogen.

According to each of the preceding embodiments, the power plant unit 1 can comprise a monitoring unit.

It is obvious to a person skilled in the art that many further modifications in addition to the exemplary embodiments described are possible without deviating from the inventive concept. The subject matter of the invention is therefore not restricted by the preceding description and is determined by the scope of protection which is defined by the claims. The broadest possible reading of the claims is authoritative for the interpretation of the claims or the description. In particular, the terms "comprise" or "contain" are to be interpreted in such a way that they refer to elements, components or steps in a non-exclusive sense, which is intended to indicate that the elements, components or steps can be present or are used that they can be combined with other elements, components or steps that are not explicitly mentioned. When the claims relate to an element or component from a group which may consist of A, B, C to N elements or components, this formulation should be interpreted to mean that only a single element of that group is required, and not necessarily a combination of A and N, B and N, or any other combination of two or more elements or components of this group.

What is claimed is:

1. A turbine for a power plant, the turbine comprising:
   a turbine housing,
   a flow channel for a compressible medium arranged in the turbine housing, wherein the flow channel has a drive side and an output side, wherein the compressible medium in the flow channel flows from the drive side to the output side, wherein a flow cross-section of the flow channel increases from the drive side to the output side so that the compressible medium can expand,
   a drive shaft and at least one output impeller arranged in the flow channel, wherein the at least one output impeller comprises an output shaft for operating a generator, wherein the output shaft is configured to be set into a rotational movement by means of the at least one output impeller when the compressible medium flows through the at least one output impeller, wherein the at least one output impeller is connected to the output shaft in a rotationally fixed manner, wherein the drive shaft and the output shaft are mechanically decoupled, and
   a circulation device comprising a fluid passage for the compressible medium, wherein the circulation device is configured such that a first partial volume of the compressible medium flows into the flow channel at the drive side and a second partial volume of the compressible medium flows into the flow channel at the output side and upstream of the at least one output impeller.

2. The turbine of claim 1, wherein the circulation device is in fluid-conducting connection with the flow channel.

3. The turbine of claim 2, wherein the circulation device contains a feed for the compressible medium, wherein the compressible medium is a heated compressible medium.

4. The turbine of claim 3, wherein the heated compressible medium is obtainable from the compressible medium by means of a heat exchanger.

5. The turbine of claim 2, wherein the fluid passage comprises an at least partially variable cross-section through which the compressible medium can flow.

6. The turbine of claim 5, wherein the circulation device contains a feed for the compressible medium, wherein the fluid passage comprising the at least partially variable cross-section is downstream of the feed, and wherein the at least partially variable cross-section through which the compressible medium flows downstream of the feed in a direction of flow of the compressible medium first increases and then decreases continuously.

7. The turbine of claim 2, wherein the circulation device contains a branch.

8. The turbine of claim 1, wherein the drive shaft is set into a rotational movement by means of an electric starter at least in a running-in phase.

9. The turbine of claim 1, wherein the drive shaft comprises a substantially conical section.

10. The turbine of claim 1, wherein the drive shaft is provided with a profile.

11. The turbine of claim 10, wherein the profile is helical or spiral-shaped.

12. The turbine of claim 1, wherein the flow channel contains a first, second or third flow channel section, wherein a cross-sectional area of at least one of the first, second or third flow channel sections changes in a direction of a longitudinal axis of the flow channel.

13. The turbine of claim 1, wherein the compressible medium is air.

14. A power plant unit comprising:
    a turbine, the turbine comprising
      a turbine housing,
      a flow channel for a compressible medium arranged in the turbine housing, wherein the flow channel has a drive side and an output side, wherein the compressible medium in the flow channel flows from the drive side to the output side, wherein a flow cross-section of the flow channel increases from the drive side to the output side so that the compressible medium can expand,
      a drive shaft and at least one output impeller arranged in the flow channel, wherein the at least one output impeller comprises an output shaft for operating a generator, wherein the output shaft is set into a rotational movement by means of the at least one output impeller when the compressible medium flows through the at least one output impeller, wherein the at least one output impeller is connected to the output shaft in a rotationally fixed manner, wherein the drive shaft and the output shaft are mechanically decoupled, and
      a circulation device comprising a fluid passage for the compressible medium, wherein the circulation device is configured such that a first partial volume of the compressible medium flows into the flow channel at the drive side and a second partial volume of the compressible medium flows into the flow channel at the output side and upstream of the at least one output impeller.

15. The power plant unit of claim 14, further comprising a heat accumulator for providing a heated compressible medium as the compressible medium, wherein the heat accumulator is chargeable by an element selected from the group consisting of a solar cell, a photovoltaic panel, an internal combustion engine, a fuel cell, a burner element for a fossil fuel, or a wind turbine.

16. A method for operating a power plant including a turbine, wherein the turbine is arranged in a turbine housing, wherein a flow channel for a compressible medium is arranged in the turbine housing, wherein the flow channel has a drive side and an output side, wherein the compressible medium in the flow channel flows from the drive side to the output side, wherein a flow cross-section of the flow channel increases from the drive side to the output side so that the compressible medium expands, wherein a drive shaft and at least one output impeller are arranged in the flow channel, wherein the at least one output impeller comprises an output shaft, wherein the at least one output impeller is connected to the output shaft in a rotationally fixed manner, wherein the drive shaft and the output shaft are mechanically decoupled, wherein a circulation device comprising a fluid passage for the compressible medium is provided, wherein the circulation device is configured such that a first partial volume of the compressible medium flows into the flow channel at the drive side and a second partial volume of the compressible medium flows into the flow channel at the output side and upstream of the at least one output impeller, the method comprising:

flowing the first partial volume of the compressible medium into the flow channel at the drive side, flowing the second partial volume of the compressible medium into the flow channel at the output side and upstream of the at least one output impeller, generating a rotational movement of the drive shaft of the turbine by the compressible medium, generating a rotational movement of the output shaft by means of the compressible medium flowing through the at least one output impeller, wherein the rotational movement of the drive shaft takes place independently of the rotational movement of the output shaft by means of the drive shaft and the output shaft being mechanically decoupled, and driving a generator with the output shaft to generate electrical energy.

17. The method for operating the power plant of claim 16, further comprising: feeding a heated heat transfer fluid from a heat accumulator to a heat exchanger for heating the compressible medium, heating the compressible medium by means of the heat transfer fluid, generating a heated compressible medium, and feeding the heated compressible medium to the turbine.

\* \* \* \* \*